Jan. 20, 1925.
J. EATON
1,523,991
COMBINATION SPARE TIRE HOLDER, LOCK, AND RIM TOOL
Filed Aug. 4, 1923
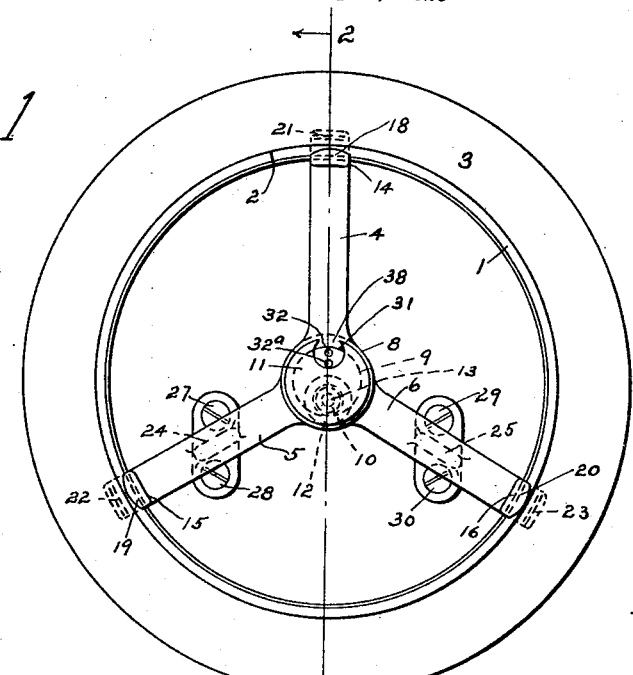
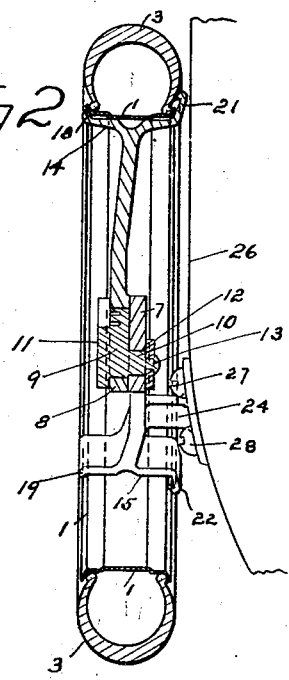
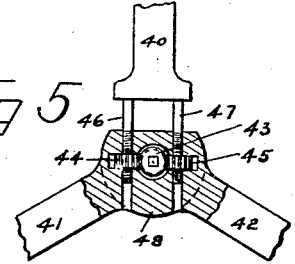
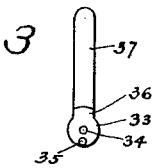
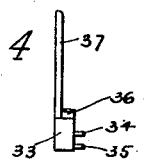
John Eaton,
Inventor,
by: Henrik J. Schmidt,
his Attorney.

Patented Jan. 20, 1925.

1,523,991

UNITED STATES PATENT OFFICE.

JOHN EATON, OF JACKSONVILLE, FLORIDA, ASSIGNOR TO SYDNEY S. RICKETT, OF JACKSONVILLE, FLORIDA.

COMBINATION SPARE-TIRE HOLDER, LOCK, AND RIM TOOL.

Application filed August 4, 1923. Serial No. 655,586.

*To all whom it may concern:*

Be it known that JOHN EATON, a citizen of the United States, residing at Jacksonville, in the county of Duval and State of Florida, has invented certain new and useful Improvements in Combination Spare-Tire Holders, Locks, and Rim Tools, of which the following is a specification.

My invention relates to spare tire holders and has for its main and particular objects and advantages to provide such a device which while acting as a spare tire holder will also act as a lock and a tool for removing the rim from the spare tire.

A further object is to provide such a device with a removable operating handle and to have this handle of such a construction that only the particular handle furnished with the device will operate it.

A still further object is to provide a spare tire holder of pleasing appearance, simple and strong in construction, easy to manipulate, and comparatively inexpensive to manufacture.

These and various other objects and advantages will be clearly understood from the following specification and from the accompanying drawing of a preferred embodiment of my invention, but it will be understood that various modifications might be made without the departing from the scope of my invention and it will further be understood that while the specification describes and the drawing illustrates a spare tire holder as used on an automobile, I do not wish to limit its use to such only as it will be plainly seen that by attaching it to a wall or stand it may be used as a tool in a shop or garage.

Fig. 1 is a front elevation of the spare tire holder, the operating handle having been removed.

Fig. 2 is a cross-sectional side view taken on line 2—2 on Figure 1. The operating handle has also been omitted in this view.

Fig. 3 is a plan view of the operating handle.

Fig. 4 a side view of the operating handle.

Fig 5 is a modification of the operating mechanism shown in Figure 1.

Referring now to all the views, simultaneously, 1 is a tire rim of the ordinary construction; 2 the slit for opening the rim and 3 the tire mounted thereon.

The spare tire holder consists of three arms 4, 5, and 6. The arms 5 and 6 are rigidly connected by a flat, circular disc 7, while the arm 4, which is movable, terminates, at its inner end in an eccentric strap 8. An eccentric 9, having a pivot and an enlarged head 11, operates in the eccentric strap 8. The pivot 10 rotates in a bearing drilled in the flat disc 7, and the eccentric is held in place by means of a washer 12, which is riveted on the stud 13 formed on the spindle 10. The washer 12 and head 11 also hold the eccentric strap 8 and the disc 7 in place. The eccentric 9, pivot 10, head 11, and stud 13 are all made in one piece, as plainly shown on Fig. 2.

The outer ends of the three arms are broadened out so as to form seats 14, 15, and 16 for the rim 1 to rest on. At the outer or forward edges of these seats, lugs 18, 19, and 20 are provided; while at the inner or rearward edges, hooks 21, 22 and 23 are provided. The arms 5 and 6 are also provided with brackets 24 and 25 and by means of these brackets, the spare tire holder is attached, as for example in this case, to the rear of an automobile 26, by screws 27, 28, 29 and 30.

A counterbored recess 31 is formed in the enlarged head 11 in such a manner that an opening 38 is formed into the recess, and in the bottom of the recess two holes 32 and 32ª are drilled. The operating handle, shown at Figs. 3 and 4, consists of a partly circular body part 33, which engages in the recess 31 and which is provided with two pins 34 and 35, which engage in the holes 32 and 32ª. A projection 36, which engages in the opening 38, extends slightly outside the circular body part and is made in one part with the handle grip 37.

The spare tire holder operates in the following manner:

When it is desired to remove the rim and tire from the holder, the circular body part 33 of the operating handle is inserted in the recess 31 in such a manner that the pins 34 and 35 engage in the holes 32 and 32ª and the projection 36 engages in the opening 38. Normally the rim 1, beside being held in place by the pressure exerted against it by the seats 14, 15, and 16, is locked in place by the three lugs 18, 19 and 20, which projects above the seats and engage the edge of the rim. Now, if the operating handle be turned either to the right or left, the eccentric 9 will cause the arm 4 to be drawn down or inward towards the center, thus allowing the rim 1 to be lifted over the lugs 18, 19 and 20.

It will be noted that by varying the location and distance between the holes 32 and 32ª, only the particular handle furnished with the particular spare tire holder, in which it fits, will operate it. Likewise the diameter of the recess 31 and the width of the projection 36 may be varied.

When it is desired to use the holder as a rim tool for removing the rim 1 from the tire 3, it is accomplished in the following manner: As explained previously, when the operating handle is turned either to the right or left, the arm 4 is drawn inwardly. If this turning is continued the hooks 21, 22, and 23 will engage in the inner edge of the rim 1 and if still continued will cause the rim to split at 2 and decrease in diameter until the tire 3 will slip over the edge of the rim. The return of the operating handle will expand the rim to its normal diameter. It will be noted, that the hooks 21, 22, and 23 are located so far above the seats 14, 15, and 16 that they will not engage the rim 1 until after the lugs 18, 19 and 20 have disengaged from the rim, so that when it is only desired to remove the spare tire from the holder, the hooks do not come into action.

It will also be noted that the circular construction of the recess 31 makes it impossible to operate the eccentric by inserting any bar or similar object in the opening 38 as no purchase can be obtained on the wall of the recess and that only a handle provided with the projection 36 can be used.

While I have explained the device as operated with an eccentric, I do not wish to limit myself to this particular operating means; any other means which will draw the arm 4 toward the center will accomplish the same results. To illustrate this I have shown a modification of the operating mechanism at Fig. 5 in which 40, 41 and 42 represent fragments of the arms. In this case the arm 40 is drawn inwardly by means of a worm 43 engaging two internally threaded worm gears 44 and 45 which in turn operate two threaded rods 46 and 47, which are rigidly secured in the arm 40, as plainly shown. The worm, worm gears and rods are all operated in suitable bearings formed in the body part 48 which connects the two stationary arms 41 and 42.

Having thus described my invention and its operation what I claim as new and wish to protect by Letters Patent is:—

1. In a spare tire holder of the class described; two stationary, radially disposed arms; a body part, provided with a bearing, connecting said stationary arms; one radially disposed, movable arm; rim engaging seats formed at the outer extremities of all of said arms; an eccentric, for operating the movable arm, operating in said bearing; an enlarged head formed on said eccentric; a circular socket formed in said head part and so located as to break the periphery of same; a detachable handle having a boss fitting in said circular socket and a projection for engaging in the opening formed in the periphery of the said head part; and means for attaching the spare tire holder.

2. In a spare tire holder of the class described; two stationary, radially disposed arms; a body part, provided with a bearing, connecting said stationary arms; one radially disposed, movable arm; rim engaging seats formed at the outer extremities of all of said hooks; rim locking means attached to said rim engaging seats; an eccentric, for operating the movable arm, operating in said bearing; an enlarged head formed on said eccentric; a circular socket formed in said head part and so located as to break the periphery of same; a detachable handle having a boss fitting in said circular socket and a projection for engaging in the opening formed in the periphery of the said head part; and means for attaching the spare tire holder.

3. In a spare tire holder of the class described; two stationary, radially disposed arms; a body part, provided with a bearing, connecting said stationary arms; one radially disposed, movable arm; rim engaging seats formed at the outer extremities of all of said arms; rim locking means and rim engaging hooks attached to said rim engaging seats; an eccentric, for operating the movable arm, operating in said bearing; an enlarged head formed on said eccentric; a circular socket formed in said head part and so located as to break the periphery of same; a detachable handle having a boss fitting in said circular socket and a projection for engaging in the opening formed in the periphery of the said head part; and means for attaching the spare tire holder.

4. In a spare tire holder of the class described; two stationary, radially disposed arms; a body part, provided with a bearing, connecting said stationary arms; one radially disposed, movable arm; rim engaging seats formed at the outer extremities of all of said arms; rim locking means and rim engaging hooks attached to said rim engaging seats; an eccentric for operating the movable arm operating in said bearing; a detachable operating handle engaging in a socket formed in the head of the eccentric; holes provided in said socket and pins provided on said operating handle for engagement in said holes; and means for attaching the spare tire holder.

In testimony whereof, I, JOHN EATON, have signed my name to this specification in the presence of two subscribing witnesses, this 21st day of July, 1923.

JOHN EATON.

Witnesses:
 HENRIK J. SCHMIDT,
 C. U. SMITH.